(12) United States Patent
Roberts-Haritonov et al.

(10) Patent No.: US 7,144,015 B2
(45) Date of Patent: Dec. 5, 2006

(54) MODULAR GAS SEALS CARTRIDGE

(75) Inventors: Lev Uryevich Roberts-Haritonov, Staines (GB); Julian Oliver Reed, Haslemere (GB); Steven Everett Hutchins, Barnstaple (GB)

(73) Assignee: Corac Group PLC, Uxbridge (GB)

( * ) Notice: Subject to any disclaimer, the term of this patent is extended or adjusted under 35 U.S.C. 154(b) by 6 days.

(21) Appl. No.: 10/804,870

(22) Filed: Mar. 19, 2004

(65) Prior Publication Data

US 2004/0183257 A1    Sep. 23, 2004

(30) Foreign Application Priority Data

Mar. 20, 2003  (GB) ................. 0306402.9
Nov. 28, 2003  (GB) ................. 0327671.4

(51) Int. Cl.
*F16J 15/34*    (2006.01)

(52) U.S. Cl. ................. 277/361; 277/369; 277/371

(58) Field of Classification Search ........ 277/365–369, 277/370–371, 408, 358, 361
See application file for complete search history.

(56) References Cited

U.S. PATENT DOCUMENTS 4,964,646  A  * 10/1990  Boster ................. 277/365
5,039,113  A  *  8/1991  Gardner ............... 277/379
5,412,977  A     5/1995  Schmohl et al.
6,494,460  B1 * 12/2002  Uth .................... 277/399
6,655,693  B1 * 12/2003  Hosanna et al. ......... 277/358
6,811,155  B1 * 11/2004  Takahashi ............. 277/362

FOREIGN PATENT DOCUMENTS

| DE | 10017669 A1 | * | 10/2001 |
|----|----|----|----|
| EP | 1 061 297 | | 12/2000 |
| JP | 05010454 A | * | 1/1993 |
| JP | 2000018392 | * | 1/2000 |
| RU | 2 084 730 | | 7/1997 |
| WO | WO 99/196648 | * | 4/1999 |

OTHER PUBLICATIONS

British Search Report dated Mar. 25, 2004 for British Patent Application No. 0327671.4.
European Search Report dated Jun. 17, 2004 for European Patent Application No. 04101132.

* cited by examiner

*Primary Examiner*—Vishal Patel
(74) *Attorney, Agent, or Firm*—Jon A. Gibbons; Fleit, Kain, Gibbons Gutman, Bongini & Bianco P.L.

(57) ABSTRACT

A tandem gas seal assembly is described for sealing between the rotor and the casing of a rotary machine. The assembly comprises two sealing stages 10, 12 mounted axially adjacent to one another on the machine rotor. In the invention, wherein the two stages 10 and 12 are totally separable from one another and each is capable of functioning as a seal when separated from the other.

15 Claims, 1 Drawing Sheet

MODULAR GAS SEALS CARTRIDGE

CROSS-REFERENCE TO RELATED APPLICATIONS

This application is based upon and claims priority from prior British Patent Application No. 0327671.4, filed on Nov. 28, 2003, which is related to British Patent Application No. 0306402.9, filed on Mar. 20, 2003, the entire disclosure of each reference which are herein incorporated by reference.

FIELD OF THE INVENTION

The present invention generally relates to seals and more particularly relates to seals for restricting leakage of a fluid about a shaft extending through a housing, such as in a compressor or a turbine, and in particular for restricting leakage of gas at elevated pressure.

BACKGROUND OF THE INVENTION

Gas seals are currently used widely to seal process gases in large rotary machines such as turbo compressors and associated turbo machinery. The industry has adopted as its standard, an arrangement of sealing cartridge which is comprised of a stacked assembly that can be slipped on to the end of the rotor.

The most common type of gas seal in current use is a tandem seal, as shown in section in FIG. 1 of the accompanying drawings. A similar seal is shown, for example, in FIG. 3 of U.S. Pat. No. 5,412,977. The cartridge comprises two stages, namely an inboard stage 10 and an outboard stage 12. The inboard stage 10 is used to seal the complete process gas pressure. The outboard stage 12 is also engineered to be capable of sealing the complete process gas pressure. However, during normal running, it is only exposed to around 5–15 bar of gas pressure, its main function being to act as a back up to the inboard stage 10. Should the inboard stage 10 suffer catastrophic failure during operation, the outboard stage 12 takes on the full sealing function and enables the compressor to be run down, stopped and the process gas pressure vented in a controlled manner.

Each stage 10, 12 comprises a primary ring 14 mounted in a retainer and balance diameter assembly 18 in the machine casing. A spring 20 within the assembly 18 acts on the primary ring 14 through a pressure plate 22 that is sealed relative to the stationary assembly housing. The spring 20 urges the primary ring towards a mating ring 16 that rotates with the machine rotor 30.

The primary ring 14 has axial end faces which are exposed to the pressure of the process gas and have different surface areas. The primary ring 14 therefore acts as a differential piston on which the pressure of the process gas exerts a force in the direction to compress the spring 20. In operation, an equilibrium occurs between the gas pressure forces and the spring force when there is a small gap between the primary and the mating rings 14 and 16. This gap prevents the wear to the surfaces of the rings 14 and 16 while limiting escape of the process gas to a small and acceptable leakage.

The manner in which a gas seal operates and the details of its construction, such as the choice of materials to make the rings, are well known in the art and need not therefore be described further in the context of the present invention.

In the known seal cartridges, the two sealing stages are mounted on a common support sleeve 40. The inner surface of the sleeve 40 and the outer surface of the rotor 30 are stepped so as to limit the extent to which the sleeve can move to the left, as viewed in FIG. 1, relative to the rotor 30. A single locknut 42 on the rotor 30 is therefore all that is required to clamp the support sleeve 40 on the rotor 30. This allows both the sealing stages 10 and 12 to be released from the machine by removal of one locknut 42. At one end, the support sleeve 40 has a radial flange 44 which carries the mating ring 16 of the inboard stage 10. The mating ring 16 is held against the flange 44 of the support sleeve 40 by a spacer sleeve 50 which itself has a radial flange 52 which carries the mating ring 16 of the outboard stage. An O-ring seal 54 seals between inner surface of the spacer sleeve 50 and the outer surface of the support sleeve 40. A locking sleeve 60 clamps the mating ring 16 of the outboard stage 12 against the flange 52 of the spacer sleeve 50 and its inner surface is also suitably sealed relative to the outer surface of the spacer sleeve 50.

The above described construction of a tandem seal is convenient in that it allows for easy replacement of both stages of the seal and it enables a compact construction in that the entire cartridge is held in place by only one locknut.

While the tandem seal is useful it has shortcomings and disadvantages. As earlier explained, it is quite common for only one stage to fail but the known construction does not allow the different stages to be worked on independently. Thus, in the embodiment illustrated in FIG. 1, in order to access the inboard stage, it is necessary to dismantle the entire outboard stage, which may not itself require attention. Many other problems can be identified, and are discussed in more detail below, which stem from the fact that the two stages cannot function separately.

SUMMARY OF THE INVENTION

The present invention mitigates the foregoing disadvantages of the prior art tandem seals and provides, a tandem gas seal assembly for sealing between the rotor and the casing of a rotary machine which comprises two sealing stages for mounting axially adjacent to one another on the machine rotor, wherein the two stages are totally separable from one another and each is capable of functioning as a seal when separated from the other.

Preferably, mating formations are formed at the adjacent axial ends of the two sealing stages to maintain the two stages in axial alignment with one another.

The mating formations may suitably include an annular collar projecting axially from the end of one of the stages and fitting over a cylindrical end region of the other sealing stage. An O-ring is advantageously provided as a means for centering the mating formations of the two sealing stages.

Even though the sealing stages are independent of one another, they are preferably stacked one against the other and retained on the rotor by means of a single locknut acting on the outboard stage. There is thus no need to sacrifice the advantages offered by prior art construction with regard to space saving and the ease of mounting and dismounting of the seal assembly on the rotary machine.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 1:
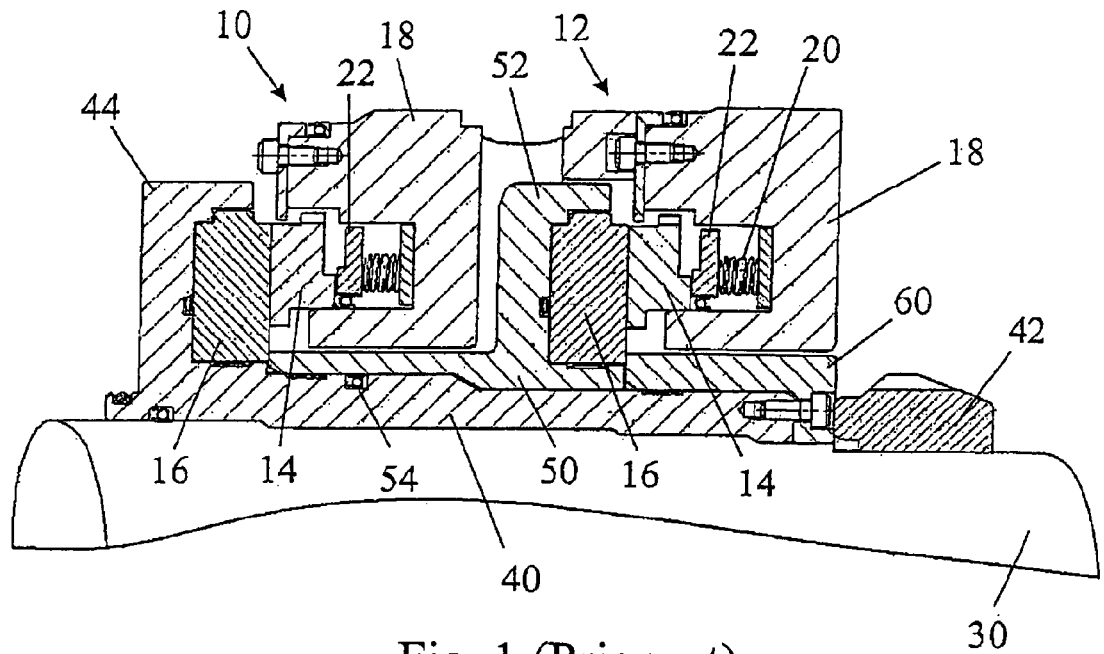
FIG. 1 is as earlier described a section through a prior art tandem seal assembly cartridge.

In the present invention, the inboard 10 and outboard 12 stages of a tandem seal are constructed as totally separate modules, each containing components corresponding to one of the sealing stages of the known tandem seal shown in FIG. 1. In order to avoid unnecessary repetition, like components have been allocated like reference numerals as previously described in FIG. 1, and will not be described a second time. Components that serve the same function, but have been modified, have also been allocated the same reference numerals, but a prime has been added to show that the component has been changed.

In general, the components secured to the casing of the rotary machine have not been changed and they operate in exactly the same way as earlier described. The important changes are the following:

There are two support sleeves 40' associated with the two stages 10 and 12 instead of a single support sleeve 40 common to the two stages.

The radial flange 52' supporting the second mating ring 16 is not formed on a spacer sleeve 50 but directly on the second of the two support sleeves 40'.

Figure 2:
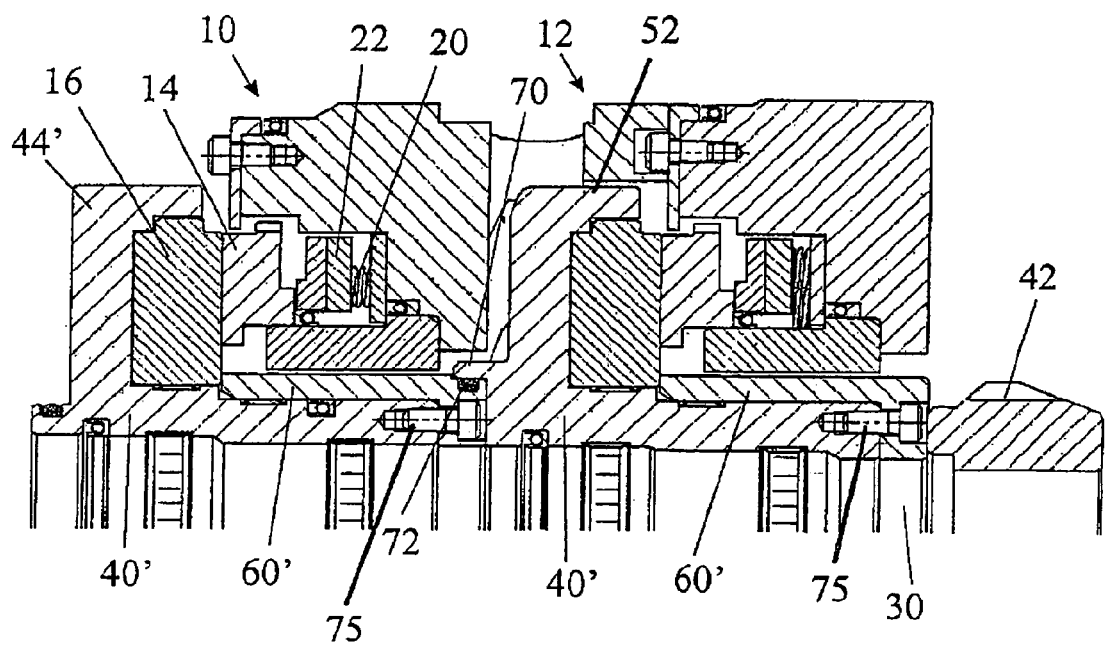
FIG. 2 is a similar section to FIG. 1 showing a tandem seal assembly according to the present invention.

In the prior art tandem seal of FIG. 1, spacer sleeve 50 is used to hold the mating ring 16 to the annular flange 44 of the inboard stage 10. On the other hand, in the tandem gas seal assembly of the present invention shown in FIG. 2, no spacer sleeve is used to hold the mating ring 16 to the annular flange 44' of the support sleeve 40' of the inboard stage 10. In the tandem gas seal assembly of the present invention, the mating ring 16 of the inboard stage 10 is held to the annular flange 44' of the inboard stage 10 by a locking sleeve 60' at the inboard stage 10.

The above modifications result in a total separation of the two sealing stages and each can now function totally independently of the other. In other words, they do not need to be placed next to one another for them both to function normally. It is preferred to mount them next to each other and each sealing stage is fastened to its respective rotating support sleeve 40' with a separate fastener 75 oriented in substantially one direction as illustrated. Further each sealing stage can then be retained using a single locknut 42 on the rotor 30, as previously described.

Though it is possible to rely exclusively on the rotor to maintain the two stages in correct alignment, it assists assembly and improves structural rigidity to provide mating formations on the axial ends of the two stages to maintain them in correct axial alignment and to provide a seal between the two stages. In the illustrated embodiment of the invention, the mating formations comprise an annular collar 70 projecting from the axial end of the support sleeve of the outboard stage surrounding a cylindrical surface defined by the end of the locking sleeve 60' of the inboard stage, the seal between the two being effected by an O-ring 72.

The separation of the sealing stages into separate modules offers several advantages, which will now be discussed.

Each of support sleeves is shorter in length for the same given diameter thus providing, improved structural integrity.

Separation of the stages allows each to be dynamically balanced independently of the other, improving both the ease and the quality of the balancing.

The modular arrangement, enables independent replacement of just one module, be it the inboard or the outboard stage. This significantly reduces down time.

Any refurbishment, repair, or replacement need only be done on one module, without having to strip the other.

Less metal is required during the manufacture as compared with a conventional tandem seal cartridge. This is because the support sleeve 40, for example, needs to be machined from a long blank having a diameter greater than that of the radial flange 44 and the spacer sleeve needs to be machined from a second blank of nearly the same size. By contrast, in the seal assembly of the present invention, the two support sleeves 40' can be machined out of a blank of approximately the same size as that required for the support sleeve 40. Aside from starting with less metal, the manufacturing process also requires less metal removal and is therefore significantly less time consuming and costly.

The assembly procedure is simplified, resulting in reduced assembly time and reduced assembly costs.

The modular arrangement enables much more rapid fault diagnosis on test, thus further reducing time and costs. The fact that there are no shared components means that a fault can be more easily located in one or other of the modules and each can be tested separately from the other.

Although a specific embodiment of the present invention has been disclosed, it will be understood by those having skill in the art that changes can be made to this specific embodiment without departing from the spirit and scope of the present invention. The scope of the present invention is not to be restricted, therefore, to the specific embodiment, and it is intended that the appended claims cover any and all such applications, modifications, and embodiments within the scope of the present invention.

What is claimed is:

1. A tandem gas seal assembly for forming a seal between a rotor and a casing of a rotary machine, the tandem gas seal comprising:

two sealing stages for mounting axially adjacent to one another in the rotary machine, each of the sealing stages comprising a rotating sub-assembly for mounting on the rotor and a stationary sub-assembly for mounting in the casing, wherein:

each rotating sub-assembly includes a support sleeve mounted on the rotor, a rotating mating ring with a front face, a locking sleeve slideably mounted on top of the support sleeve and a fastener releasably securing the locking sleeve and the support sleeve to one another, a first end of the locking sleeve bearing against the front face of the mating ring thereby retaining the mating ring in the rotating sub-assembly;

each rotating sub-assembly of the two sealing stages including the support sleeve is totally separable from one another and each stationary sub-assembly of the two sealing stages is totally separable from one another, each of the two stages is capable of functioning as a seal when separated from the other, and mating formations formed at adjacent axial ends of the rotating sub-assembly of the two sealing stages to maintain the two sealing stages in axial alignment with one another.

2. The tandem gas seal assembly of claim 1, wherein the mating formations include an annular collar projecting axially from an axial end of the rotating sub-assembly of a first of the two sealing stages and the annual collar fitting over a cylindrical end region of rotating sub-assembly of the second of the two sealing stages.

3. The tandem gas seal assembly of claim 2, further comprising means for effecting a gas tight seal between the mating formations of each rotating assembly of the two sealing stages.

4. The tandem gas seal assembly of claim 1, wherein each of the two sealing stages is dynamically balanced separately from the other of the two sealing stages.

5. The tandem gas seal assembly of claim 1, wherein the two scaling stages directly abut one another and are retained on the rotor by means of a lock nut applying an axial force to only an outer of the two sealing stages.

6. A rotary machine comprising:
a rotor;
a casing; and
a tandem gas seal for forming a seal between the rotor and the casing of the rotary machine, the tandem gas seal including two sealing stages mounted axially adjacent to one another in the rotary machine, each stage comprising a rotating sub-assembly mounted on the rotor and a stationary sub-assembly mounted in the casing, wherein
each rotating sub-assembly includes a support sleeve mounted on the rotor, a rotating mating ring with a front face, a locking sleeve slideably mounted on top of the support sleeve and a fastener releasably securing the locking sleeve and the support sleeve to one another, a first end of the locking sleeve bearing against the front face of the mating ring thereby retaining the mating ring in the rotating sub-assembly;
each of the rotating sub-assembly of the two sealing stages including the support sleeve is totally separable from one another and each of stationary sub-assembly of the two sealing stages is totally separable from one another,
each of the two sealing stages is capable of functioning as a seal when separated from the other stage, and
mating formations formed at adjacent axial ends of each rotating sub-assembly of the two sealing stages to maintain the two sealing stages in axial alignment with one another.

7. The rotary machine of claim 6, wherein the mating formations include an annular collar projecting axially from an axial end of the rotating sub-assembly of a first of the two sealing stages and the annual collar fitting over a cylindrical end region of the rotating sub-assembly of the second of the two sealing stages.

8. The rotary machine of claim 7, wherein the tandem gas seal further comprises means for effecting a gas tight seal between the mating formations of each rotating assembly of the two sealing stages.

9. The rotary machine of claim 6, wherein each of the two sealing stages is dynamically balanced separately from the other of the two sealing stages.

10. The rotary machine of claim 6, wherein the two sealing stages directly abut one another and are retained on the rotor by means of a lock nut applying an axial force to only an outer of the two scaling stages.

11. A tandem gas seal assembly for forming a seal between a rotor and a casing of a rotary machine, the tandem gas seal comprising:
a first sealing stage and a second sealing stage, where each of the first sealing stage and the second sealing stage are adapted for mounting axially adjacent to one another on a machine rotor, each of the first sealing stage and the second sealing stage includes a rotating sub-assembly for mounting on the rotor and a stationary sub-assembly for mounting in the casing wherein
each rotating sub-assembly includes a support sleeve mounted on the rotor, a rotating mating ring with a front face, a locking sleeve slideably mounted on top of the support sleeve a fastener releasably securing the locking sleeve and the support sleeve to one another, and a first end of the locking sleeve bearing against the front face of the mating ring thereby retaining the mating ring in the rotating sub-assembly;
each rotating sub-assembly of the first sealing stage and the second sealing state including the support sleeve is totally separable from one another and each stationary sub-assembly of the two stages is totally separable from one another,
each of the first sealing stage and the second sealing stage is capable of functioning as a seal when separated from the other stage, and
mating formations formed at adjacent axial ends of the rotating sub-assembly of the first sealing stage and the rotating sub-assembly of the second sealing stage to maintain the first sealing stage in axial alignment with the second sealing stage.

12. The tandem gas seal assembly of claim 11, wherein the mating formations include an annular collar projecting axially from an axial end of the rotating sub-assembly of the first sealing stage and the annual collar fitting over a cylindrical end region of the rotating sub-assembly of the second sealing stage.

13. The tandem gas seal assembly of claim 12, further comprising means for effecting a gas tight seal between the mating formations of each rotating sub-assembly of the first sealing stage and the second sealing stage.

14. The tandem gas seal assembly of claim 11, wherein the first sealing stage is dynamically balanced separately from the second sealing stage.

15. The tandem gas seal assembly of claim 11, wherein the first sealing stage and the second sealing stage are directly abut one another and are retained on the rotor by means of a lock nut applying an axial force to only an outer of the first sealing stage and the second sealing stage.

* * * * *